United States Patent Office 3,177,236
Patented Apr. 6, 1965

3,177,236
PROCESS FOR PREPARING CYANOALKYL-
SILICON COMPOUNDS
Victor B. Jex, Clarence, N.Y., and Robert Y. Mixer,
Orange, Calif., assignors to Union Carbide Corporation,
a corporation of New York
No Drawing. Filed Dec. 4, 1962, Ser. No. 242,051
4 Claims. (Cl. 260—448.2)

This invention relates to cyanoalkylsilicon compounds including cyanoalkylsilanes and cyanoalkylpolysiloxanes and to a process for their production. More particularly, the invention is concerned with cyanoalkylsilanes containing at least one hydrocarbyloxy group bonded to the silicon atom thereof and cyanoalkylpolysiloxanes as new compositions of matter and to a process for their production which includes the step of forming a reactive mixture of a metal cyanide with a hydrocarbyloxysilane or a siloxane containing at least one haloalkyl group bonded to the silicon atom thereof.

The process of the instant invention can be carried out by forming a reactive mixture of a metal cyanide, such as an alkali or alkaline earth metal cyanide, with a haloalkyl-silicon compound such as chloroalkylhydrocarbyloxy-silane or chloroalkylpolysiloxane. The reaction that takes place is a metathesis and may be graphically represented by the following general equation which depicts, for the purpose of illustration, the reaction of sodium cyanide with gamma-chloropropyltriethoxysilane:

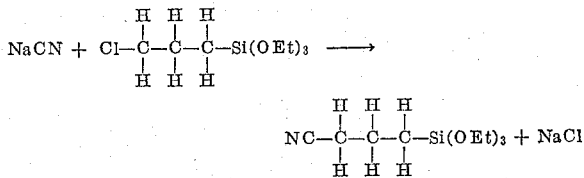

It is an essential feature of our invention that the haloalkylhydrocarbyloxysilanes or haloalkylpolysiloxanes which we employ as one of our starting materials be free of halogen substitution on the beta carbon atom of the haloalkyl group. According to our experience, a beta-haloalkylhydrocarbyloxysilane does not react with a metal cyanide to replace the halogen on the beta carbon atom with a cyano group.

The haloalkylhydrocarbyloxysilanes free of halogen substitution on the beta carbon atom of the haloalkyl group which we prefer to employ in the practice of our invention are the chloroalkylhydrocarbyloxysilanes. While the invention is hereinafter fully described with respect to the use of such chloroalkylhydrocarbyloxysilanes as starting materials therefor, it is to be understood that other haloalkylhydrocarbyloxysilanes as for example bromoalkyl- and iodoalkylhydrocarbyloxysilanes can be employed with good results. It is also to be understood that for the purpose of describing our invention our preferred starting materials, the chloroalkylhydrocarbyloxysilanes are free of chlorine substitution on the beta carbon atom of the chloroalkyl group. In a like manner, the compounds of our invention, the cyanoalkylhydrocarbyloxysilanes are free of cyano substitution on the beta carbon atom of the cyanoalkyl group.

The chloroalkylhydrocarbyloxysilane starting materials suitable for use in the process of the invention may be graphically represented by the following formula:

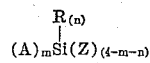

where A represents a chloroalkyl group, free of chlorine substitution on the beta carbon atom of the group, R represents a hydrocarbyl group, as for example, an alkyl group, a cycloalkyl group or an aryl group, Z represents a hydrocarbyloxy group, $m$ is a whole number having a value of from 1 to 3, $n$ is a whole number having a value of from 0 to 2 with the sum of $m$ and $n$ not being less than 1 nor more than 3. The chloroalkyl groups free of chlorine substitution on the beta carbon atom of the group, which A represents include the monochloroalkyl groups as well as the polychloroalkyl groups such as the dichloroalkyl, the trichloroalkyl and the like. Illustrative of the monochloroalkyl groups which A represents are: the alpha-chloroalkyl groups which include chloromethyl, alpha-chloroethyl, alpha-chloropropyl, alpha-chlorobutyl, alpha-chloropentyl and the like; the gamma-chloroalkyl groups which include gamma-chloropropyl, gamma-chlorobutyl, gamma-chloroisobutyl, gamma-chloropentyl, gamma-chlorohexyl and the like; the delta-chloroalkyl groups which include delta-chlorobutyl, delta-chloropentyl, delta-chlorohexyl, delta-chloroheptyl and the like; the epsilon-chloroalkyl groups which include epsilon-chloropentyl, epsilon-chlorohexyl, epsilon-chloroheptyl and the like. Illustrative of the dichloroalkyl groups which A represents are: alpha,gamma-dichloropropyl, gamma,gamma-dichloropropyl, gamma,delta-dichlorobutyl, gamma,delta-dichloropentyl and the like. Illustrative of the trichloroalkyl groups which A represents are: alpha,gamma,gamma-trichloropropyl, gamma,delta,delta-trichlorobutyl, alpha,gamma,delta-trichlorobutyl, gamma,delta,epsilon-trichloropentyl and the like. In the practice of our invention we prefer that the chloroalkyl group or groups bonded to the silicon atom of our starting silanes contain not more than two chlorine atoms in the group. The hydrocarbyl groups represented by R include the saturated aliphatic hydrocarbyl groups as well as the aromatic hydrocarbyl groups. Illustrative of the saturated aliphatic hydrocarbyl groups which R represents are: the alkyl groups which include methyl, ethyl, propyl, butyl, pentyl and the like and the cycloalkyl groups which include cyclopentyl, cyclohexyl and the like as well as the substituted cycloalkyl groups such as methylcyclopentyl, methylcyclohexyl and the like. Illustrative of the aromatic hydrocarbyl groups which R also represents are the aryl groups such as phenyl, naphthyl and the like as well as the substituted phenyl and naphthyl groups which include tolyl, ethylphenyl, methylnaphthyl and the like. Illustrative of the hydrocarbyloxy groups which Z represents are the alkoxy groups and the aryloxy groups, such as methoxy, ethoxy, propoxy, butoxy, phenoxy and the like.

The metal cyanide starting materials which can be employed to react with a chloroalkylhydrocarbyloxysilane are the ionic metal cyanides as for example, the alkali metal and alkaline earth metal cyanides. In the practice of our invention we prefer to employ the alkali metal cyanides such as sodium cyanide, potassium cyanide and the like. Illustrative of the alkaline earth metal cyanides which can be employed in our process are barium cyanide, calcium cyanide, and the like.

While the reactants, namely the metal cyanide and chloroalkylhydrocarbyloxysilane can be employed in chemically equivalent amounts based on the cyanide and chlorine content of the respective starting materials, we prefer to employ the metal cyanide in amounts greater than the chemical equivalent. For example, we have found it desirable to use from about 1.5 to 4 chemical equivalents of the metal cyanide, based on the cyanide content thereof, per chemical equivalent of the chloroalkylhydrocarbyloxysilane, based on the chlorine content thereof. Amounts of the metal cyanide in excess of the greater ratio set forth above can also be employed, however, no material advantage is obtained thereby.

In the practice of our invention the reaction between a chloroalkylhydrocarbyloxysilane and an ionic metal cyanide is carried out within a highly polar liquid organic compound in which the starting materials are mutually soluble to an extent whereby the two reacting substances are brought into reactive contact. In the absence of such a solvent, according to our experience, the reaction does not appear to take place.

We have found that the reaction between a chloroalkylhydrocarbyloxysilane and an ionic metal cyanide within a highly polar liquid organic compound is a liquid-solid phase reaction which is driven toward completion when the metal chloride reaction product is less soluble in the highly polar liquid organic compound than the corresponding metal cyanide starting material.

Illustrative of the organic liquid compounds in which our starting materials are mutually soluble to the extent whereby they are brought into reactive contact, and in which our starting ionic metal cyanides are more soluble than the corresponding metal chloride reaction products, are the highly polar nitrogen-containing organic liquid compounds. Most suitable for use in our process are those highly polar nitrogen-containing liquid organic compounds commonly known as the dialkyl acylamide compounds which can be graphically depicted by the structural formula:

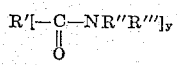

where R' is a mono-, di- or trivalent, saturated or unsaturated, aliphatic hydrocarbyl group and preferably either an alkyl, alkylene or alkyenylene group containing from 1 to 5 carbon atoms, R" and R'" are alkyl groups, preferably methyl, ethyl or propyl groups and y is a numeral having a value of 1, 2 or 3. Illustrative of such compounds are:

N,N-dimethylformamide,
N,N-diethylformamide,
N,N-dipropylformamide,
N,N-dimethylacetamide,
N,N-dimethylacetamide,
N,N-diethylpropionamide,
N,N,N',N'-tetramethylmalonamide,
N,N,N',N'-tetramethyl-alpha-ethylmalonamide,
N,N,N',N'-tetramethylglutaramide,
N,N,N',N'-tetramethylsuccinamide,
N,N,N',N'-tetramethylfumaramide,
N,N,N',N'-tetramethylitaconamide.

The dialkyl acylamide compounds which we prefer to employ in our process are the dialkylformamides.

One of the advantages derived from the use of highly polar nitrogen-containing liquid organic compounds as solvents for the reaction lies in the substantial solubility of the metal cyanide starting materials therein as compared to relatively poor solubility of the corresponding metal chloride in the same solvent. Such extreme differences in solubility permit the reaction to be readily driven toward completion. The table below, based on semiquantitative data is provided to illustrate the substantial differences in the solubility of typical metal cyanide starting materials and their corresponding metal chloride reaction products in a highly polar liquid organic nitrogen-containing compound.

Solubility in N,N-dimethylformamide:

| | Grams per 100 cc. |
|---|---|
| Potassium cyanide | 0.22 |
| Sodium cyanide | 0.76 |
| Potassium chloride | less than 0.05 |
| Sodium chloride | less than 0.05 |

In carrying out our process, the amount of solvent employed is not narrowly critical and may vary over wide limits. Preferably, the amount of solvent employed should be sufficient to completely dissolve the chloroalkylhydrocarblyoxysilane starting materials, which for the most part are miscible with the solvent in all proportions. We have found that amounts of the solvent which vary from about 20 parts to about 100 parts for each 100 parts of the combined weights of the starting materials most suitable. Amounts of the solvent below about 20 parts by weight and above 100 parts by weight may also be employed, however, no commensurate advantage is obtained thereby.

The reaction can be conducted at a temperature which may vary from about 0° to 200° C. and above. However, it is desirable to avoid temperatures so high as to favor cleavage of the carbon to silicon bond or bonds of the silane and thus, decrease the yield of the cyanoalkyl product. In the practice of our invention, we prefer to employ temperatures within the range of from 25° C. to about 175° C. When carrying out the process in the presence of a solvent it is preferred that the reaction mixture be heated to and maintained at its boiling temperature, under total reflux, over the period of the reaction.

Starting with potassium cyanide and gamma-chloropropyltriethoxysilane, which are illustrative of two of our starting materials, it will be seen from the equation set forth hereinabove, that in our reaction the cyano group of the potassium cyanide will displace the chlorine group of the silane starting material with a consequent formation of cyanpropyltriethoxysilane. In a like manner, when a polychloroalkylsilane is employed as the silane component in our process, the chlorine groups thereof are displaced by cyano groups supplied by the potassium cyanide or other metal cyanide molecules. Obviously, as the reaction proceeds the concentrations of the reactants in the reaction mixture decrease from their initial values while the concentrations of the products increase from an initial value of zero. Using our solvents in the process of our invention, potassium chloride precipitates from solution during the course of the reaction and any undissolved potassium cyanide present goes into solution at approximately the same rate at which the potassium chloride precipitates.

As far as is known, the course of the reaction between an ionic metal cyanide and a chloroalkylhydrocarbyloxysilane in the presence of a highly polar liquid organic solvent does not depart from the well established laws or principles applicable to opposing reactions, dynamic equilibrium and equilibrium concentrations, enunciated as early as 1876 by Guldburg and Waage. The point of equilibrium in the present reaction is apparently shifted in the direction of the formation of the products by the precipitation of the alkali or alkaline earth metal chloride which accounts for the increased yields of our process. Of course, the point of equilibrium may also be shifted in the direction of the formation of the products by other expedients as for example by decreasing the concentration of the cyanoalkylhydrocarbyloxysilane product as by distillation.

The cyanoalkylhydrocarbyloxysilane reaction products are soluble in the highly polar liquid organic nitrogen-containing compounds employed as solvents in our process. Such cyanoalkylhydrocarbyloxysilanes normally have boiling temperatures different from those of the solvents employed. Therefore, they may be removed from solution by distillation techniques. Obviously, the more efficient the distillation column the better the results, particularly where the boiling points of the desired product and solvent lie close together.

The reaction between an ionic metal cyanide and a chloroalkylhydrocarbyloxysilane in the presence of a highly polar liquid organic nitrogen-containing compound is preferably conducted under substantially anhydrous conditions because of the susceptibility of the cyano group and the alkoxy group to undergo hydrolysis. However, the presence of some moisture or water will not completely inhibit the reaction or destroy the reactants, although the yield of the desired products is somewhat lowered. In the practice of our process we prefer to employ starting materials which are in a substantially anhydrous state. Thus, if desired, the starting materials may be passed over anhydrous calcium sulfate to remove any moisture contained therein.

We have found that cyanoalkylhydrocarbyloxysilanes can be employed as the starting materials for the production of their corresponding cyanoalkylchlorohydrocarbyloxysilanes as well as their corresponding cyanoalkylchlorosilanes. Such can be accomplished by reacting, under substantially anhydrous conditions, a cyanoalkylhydrocarbyloxysilane with a chlorinating compound in the presence of a suitable solvent. Examples of chlorinating compounds which we can employ includes phosphorous trichloride, phosphorous pentachloride, benzyl chloride, thionyl chloride, silicon tetrachloride and the like. Illustrative of the preparation of a cyanoalkylchlorosilane by this process is the production of delta-cyanobutyltrichlorosilane which can be accomplished by adding under substantially anhydrous conditions a solution of phosphorous pentachloride to a solution of delta-cyanobutyltriethoxysilane and heating the mixture to its boiling temperature. Delta-cyanobutyltrichlorosilane as well as the two delta-cyanobutylchloroethoxysilanes can be recovered by distillation of the reaction mixture.

The cyanoalkylsilanes prepared by the process of our invention which have at least one hydrolyzable group bonded to the silicon atom thereof, include the hydrolyzable mono-cyanoalkylsilanes which are free of cyano substitution on the beta carbon atom of the alkyl group thereof and the hydrolyzable polycyanoalkylsilanes which are also free of cyano substitution on the beta carbon atom of the alkyl group thereof. Such silanes can be depicted by the following formula:

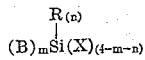

where B represents a cyanoalkyl group, other than a cyanoethyl group, free of cyano substitution on the beta carbon atom of the alkyl group, such as cyanomethyl, alpha-cyano-propyl, alpha - cyanobutyl, gamma - cyanopropyl, gamma - cyanobutyl, delta-cyanobutyl, gamma-cyanopentyl, delta - cyanopentyl, epsilon - cyanopentyl, gamma-cyanohexyl, delta-cyanohexyl, epsilon-cyano-exylzeta-cyanohexyl and the like or a polycyanoalkyl group such as alpha, gamma-dicyanopropyl, gamma, delta-dicyanobutyl, delta, epsilon-dicyanopentyl, alpha, gamma-dicyanohexyl, delta, epsilon-dicyanohexyl, epsilon,zeta-dicyanohexyl, gamma-gamma,delta-tricyanobutyl, gamma-delta,epsilon-tricyanopentyl and the like, R represents a hydrocarbyl group as for example an alkyl, cycloalkyl, or aryl group such as a methyl, ethyl, propyl, butyl, pentyl, cyclopentyl, methylcyclohexyl, phenyl, methylphenyl and the like, X represents a hydrocarbyloxy group which includes the alkoxy and aryloxy groups such as methoxy, ethoxy, propoxy, phenoxy and the like or a chlorine atom, $m$ is a whole number having a value of from 1 to 3, $n$ is a whole number having a value of from 0 to 2 with the sum of $m$ and $n$ not being less than 1 or more than 3. Illustrative of the hydrolyzable cyanoalkylsilanes made by our process are
cyanomethyltriethoxysilane,
alphacyanopropyltriethoxysilane,
alphacyanobutyltriethoxysilane,
alpha-cyanobutyltriphenoxy-silane,
gamma-cyanopropyltriethoxysilane,
gamma-cyano-propyltrichlorosilane,
gamma-cyanopropylmethyldiethoxy-silane,
gamma-cyanopropylmethyldichlorosilane,
gamma-cyanopropylethyldiethoxysilane,
gamma-cyanoprophylethyldichlorosilane,
gamma-cyanopropylphenyldiethoxysilane,
gamma-cyanopropylphenyldichlorosilane,
gamma-cyanobutyltriethoxysilane,
gamma-cyanobutylethyldiethoxysilane,
gamma-cyanobutyltrichlorosilane,
delta-cyanobutyltriethoxysilane,
delta-cyanobutyltrichlorosilane,
delta-cyanobutylethyldiethoxysilane,
delta-cyanobutylethyldichlorosilane,
delta-cyanobutylethylphenylethoxysilane,
gamma-cyanopentyltriethoxysilane,
delta-cyanopentyltriphenoxysilane,
delta-cyanopentylethyldiethoxysilane,
epsilon-cyanopentyltriethoxysilane,
epsilon-cyanopentyltrichlorosilane,
epsilon-cyanopentylethylchloroethoxysilane,
epsilon-cyanopentylethyldiethoxysilane,
epsilon-cyanopentyldiethylethoxysilane,
bis(gamma-cyanopropyl)dichlorosilane,
bis(gamma-cyanopropyl)diethoxysilane,
bis(gamma-cyanobutyl)diphenoxysilane,
tris(gamma-cyanobutyl)ethoxysilane,
bis(gamma-cyanobutyl)ethylethoxysilane,
bis(delta-cyanobutyl)diethoxysilane,
bis(delta-cyanobutyl)dichlorosilane,
tris(epsilon-cyanopentyl)ethoxysilane,
alpha,gamma-dicyanopropyltriethoxysilane,
gamma,delta-dicyanobutyltriethoxysilane,
gamma,delta-dicyanobutyltrichlorosilane,
gamma,delta-dicyanobutylethyldiethoxysilane,
gamma,delta-dicyanobutylethylphenylethoxysilane,
gamma,delta-dicyanobutylphenyldichlorosilane,
gamma,delta,epsilon-tricyanopentyltriethoxysilane
and the like.

The cyanoalkylsilanes find particular use as the starting materials in the production of nitrogen- and silicon-containing sizes for fibrous glass materials. More particularly, those cyanoalkylsilanes containing at least one alkoxy or aryloxy group bonded to the silicon atom thereof can be hydrogenated to produce their corresponding novel aminoalkylalkoxysilanes and aminoalkylaryloxysilanes, which compounds have been found extremely desirable as sizes for fibrous glass materials employed in combination with epoxy, phenolic, and melamine condensation resins for the production of fibrous glass laminates. Such hydrogenation process, new aminoalkylsilanes and the use of such silanes as sizes are disclosed and claimed in copending United States applications Serial Nos. 483,-423, filed January 21, 1955, and 483,422, filed January 21, 1955, both now abandoned.

The cyanoalkylchlorosilanes can also be employed as starting materials in the production of amino-alkylhydrocarbyloxysilane sizes. By way of illustration, delta-cyanobutyltrichlorosilane is first esterified with an alcohol, as for example ethanol to prepare the corresponding delta-cyanobutyltriethoxysilane, which can then be hydrogenated to the epsilon-aminopentyltriethoxysilane compound.

The cyanoalkylsilanes which contain at least one hydrolyzable group, as for example, an alkoxy group or chlorine atom, bonded to the silicon atom thereof can also be useful in the production of cyanoalkylpolysiloxanes. Thus, the trifunctional cyanoalkylsilanes, which contain three hydrolyzable groups bonded to the silicon atom thereof, are hydrolyzed to cross-linked cyanoalkyl-polysilioxanes and the difunctional cyanoalkylsilanes, which contain two hydrolyzable groups bonded to the silicon atom thereof, are hydrolyzed to cyclic and linear cyanoalkylpolysiloxanes while the monofunctional cyanoalkylsilanes which contain only one hydrolyzable group bonded to the silicon atom thereof, are hydrolyzed to dimeric cyanoalkylsiloxanes.

Hydrolysis of the cyanoalkylsilanes is accomplished by the addition of such silanes to water. As hydrolysis of the cyanoalkylalkoxysilanes proceeds rather slowly, small amounts of an acidic or basic catalyst can be employed with hydrolysis media which can comprise water-ice mixtures or slurries. We prefer to carry out the hydrolysis reaction by first mixing the cyanoalkylsilane with a liquid organic compound completely miscible therewith, as for example, diethyl ether and adding the solution to a medium comprising a mixture of water and the organic ether, with the subsequent addition of the catalyst. By way of illustration, delta-cyanobutylpolysiloxane is prepared by forming a mixture of delta-cyanobutyltriethoxysilane and diethyl ether, as for example, 100 parts of the silane and 20 parts of the ether, and adding the mixture to a beaker containing a mixture of water, ice and diethyl ether. A small amount of dilute hydrochloric acid is then added to the mixture. There results a two-phase system, the phases being aqueous ethanol and the other phase being delta-cyanobutylpolysiloxane in diethyl ether. The aqueous ethanol phase is then decanted. Upon evaporation of the ether or other solvent from the non-aqueous phase preferably under reduced pressure, there is obtained as a residue a partially condensed delta-cyanobutylpolysiloxane. The partially condensed material can be completely cured to a hard brittle polymer. In a like manner, the difunctional cyanoalkylsiloxanes and the monofunctional silanes can be hydrolyzed to polymeric compositions.

The use of catalysts to promote the hydrolysis of the new cyanoalkylchlorosilanes is not necessary as such reactions proceed quite rapidly. In such instances it is suggested that the reaction be conducted in the presence of a solvent and at temperatures below about 25° C.

Cyanoalkylpolysiloxanes prepared by the hydrolysis of the compounds made by the process of our invention can be depicted by various general formulae depending upon the functionality of the starting monomer. By way of illustration trifunctional cyanoalkyl and polycyanoalkylsilanes upon hydrolysis become cyanoalkylpolysiloxanes containing the repeating unit:

$$B\!-\!Si\!-\!O_{3/2}$$

which, when in a completely condensed state are represented by the formula:

$$B\!-\!SiO_{3/2w}$$

and difunctional cyanoalkyl and polycyanoalkylsilanes upon hydrolysis become cyanoalkylpolysiloxanes containing the unit:

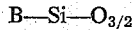

or the unit $$B_2SiO$$

which when in a completely condensed state are represented by the formulae:

$$[B_2SiO]_y$$

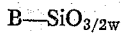

while the monofunctional cyanoalkyl and polycyanoalkylsilanes upon hydrolysis become disiloxanes containing the unit:

or

or

which, when in a completely condensed state are represented by the structural formulae:

$$[BR_2SiO_{1/2}]_2$$
$$[B_2RSiO_{1/2}]_2$$
$$[B_3SiO_{1/2}]_2$$

where B represents either a cyanoalkyl group, other than a cyanoethyl group, which is free of cyano substitution on the beta carbon atom of the group or a polycyanoalkyl group, free of cyano substitution on the beta carbon atom of the group, and $w$ and $y$ represent whole numbers with $w$ having a value of at least four and $y$ having a value of at least three.

The difunctional cyanoalkylsilanes form cyclic as well as linear polymers upon hydrolysis. For example, epsilon-cyanopentylethyldiethoxysilane upon hydrolysis produces in addition to a linear epsilon-cyanopentylethylpolysiloxane, various cyclic siloxanes such as the cyclic trimer, tetramer, pentamer and hexamer of epsilon-cyanopentylethylsiloxane.

The polymeric cyanoalkylsiloxanes find use in numerous applications depending upon the type of polymers prepared. By way of illustration, the trifunctional cyanoalkyl and polycyanoalkylsilanes upon hydrolysis become highly cross-linked, hard, infusible polymers which are characterized by resistance to thermal degradation at temperatures as high as 200° C. Such polymers have been found extremely useful as protective coatings for metallic surfaces which are normally subjected to severe temperature conditions. The linear and cyclic cyanoalkyl and polycyanoalkylsiloxanes find particular use as greases and oils in the lubrication of moving metal surfaces. Monofunctional cyanoalkyl and polycyanoalkylsilanes as well as their hydrolysis products namely the corresponding dimers are employed as endblocking compounds to control the chain length of the linear cyanoalkyl polymers in the production of oils. Typical of the cyanoalkylpolysiloxanes are those having the formulas:

$[(CH_3)_2SiO][NC(CH_2)_3Si(CH_3)O]$;
$[(C_6H_5)(CH_3)SiO][NC(CH_2)_4SiO_{3/2}][(CH_3)_3SiO_{1/2}]$;
$[C_2H_5SiO_{3/2}][NCCH_2CH(CH_3)CH_2Si(CH_3)O]$;
$[C_6H_5SiO_{3/2}][(C_6H_5)_2SiO][(NCCH_2)_2Si(CH_3)O_{1/2}]$;
$[NCCH_2CH(CH_3)CH_2Si(CH_3)O]$ and the like.

The cyanoalkylpolysiloxanes which are represented by the unit formula:

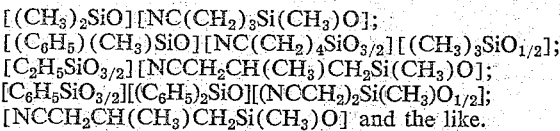

and those having units of this formula and in addition units of the formula:

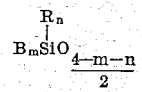

wherein B, R, $m$ and $n$ are as previously defined and $x$ is an integer from 0 to 3 inclusive are also prepared by reacting haloalkylpolysiloxanes with a metal cyanide in the same manner hereinbefore described for reacting the haloalkylhydrocarbyloxysilane with a metal cyanide.

The haloalkylpolysiloxanes employed as starting materials are those having the unit formula:

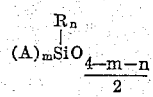

and those having units of this formula and in addition units of the formula:

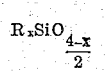

wherein R, A, $m$, $n$ and $x$ are as previously defined. These starting materials include siloxanes of the formulas:

$[(CH_3)_2SiO][Cl(CH_2)_3Si(CH_3)O]$;
$[(C_6H_5)(CH_3)SiO][Cl(CH_2)_4SiO_{3/2}][(CH_3)_3SiO_{1/2}]$;
$[C_2H_5SiO_{3/2}][ClCH_2CH(CH_3)CH_2Si(CH_3)O]$;
$[C_6H_5SiO_{3/2}][(C_6H_5)_2SiO][(ClCH_2)_2Si(CH_3)O_{1/2}]$;
$[ClCH_2CH(CH_3)CH_2Si(CH_3)O]$ and the like.

The following examples are illustrative of our invention:

EXAMPLE 1

To a flask connected to a reflux condenser were added 0.41 mole (99.7 g.) of gamma-chloropropyltriethoxysilane, 0.82 mole (60 g.) of anhydrous sodium cyanide, and 250 milliliters (236 g.) of anhydrous N,N-dimethylformamide. The mixture was then heated to its boiling temperature (155° C.) under total reflux, for a period of six hours. After heating, the contents of the flask were cooled and passed through a "Magnesol" filter to remove the solid content therefrom. The filtrate was then placed in a flask connected to a fractionating column and distilled under reduced pressure. There was obtained 84 g. of a product boiling at a temperature of from 79° to 80° C. under a pressure of 0.6 mm. Hg. This product was identified as gamma-cyanopropyltriethoxysilane by its boiling temperature and by its density and refractive index at 25° C. ($d_4^{25}$ 0.961, $n_D^{25}$ 1.4152). Other procedures employed in the identification of gamma-cyanopropyltriethoxysilane product included infrared spectra analysis as well as elemental analysis for carbon, silicon, and nitrogen content and the determination of the molar refraction of the product. Listed below are the values in percent by weight obtained from such elemental anlysis and the value obtained from the molar refraction determination as well as the corresponding calculated values for gamma-cyanopropyltriethoxysilane.

|  | Gamma-cyanopropyltriethoxysilane | |
| --- | --- | --- |
|  | Found | Calculated |
| Carbon | 51.8 | 51.9 |
| Silicon | 12.0 | 12.1 |
| Nitrogen | 6.3 | 6.1 |
| Molar Refraction | 60.33 | 59.95 |

The 84 g. of gamma-cyanopropyltriethoxysilane obtained represented a yield of 88 percent based on the number of moles of the starting gamma-chloropropyltriethoxysilane.

EXAMPLE 2

To a 500 ml., three-necked flask equipped with a thermometer, mechanical stirrer and reflux condenser was added 0.75 mole (37 g.) of anhydrous sodium cyanide, and 100 ml. (94.5 g.) of anhydrous N,N-dimethylformamide. There was then added to the flask, from a dropping funnel, 0.48 mole (101.4 g.) of chloromethyltriethoxysilane. During the dropwise addition, which required about one-half hour, the contents of the flask were continually stirred. After the addition, the reaction mixture, while continually stirred, was heated to a temperature of about 100° C. for a period of about two hours. The reaction mixture was then cooled to room temperature and passed through a diatomaceous earth filter to remove the solid content therefrom. The filtrate was then placed in a flask connected to a fractionating column and distilled under reduced pressure. There was obtained 39 g. of a product boiling at a temperature of 58–59° C. under a pressure of 0.1 mm. Hg. The product had a refractive index, $n_D^{25}$, at 25° C. of 1.4204, a density of $d_4^{25}$, at the same temperature of 0.988 and was identified as cyanomethyltriethoxysilane by infra-red spectra and elemental analysis. In the table below, there appears the values obtained, in percent by weight, of the elemental analysis as well as the corresponding calculated values for cyanomethyltriethoxysilane.

|  | Cyanomethyltriethoxysilane | |
| --- | --- | --- |
|  | Found | Calculated |
| Carbon | 45.7 | 47.26 |
| Silicon | 13.0 | 13.8 |
| Nitrogen | 7.3 | 6.89 |

The 39 g. of cyanomethyltriethoxysilane obtained represented a yield of 41 percent based on the number of moles of the chloromethyltriethoxysilane starting material.

EXAMPLE 3

To a 500 ml., three-necked flask equipped with a thermometer, mechanical stirrer and reflux condenser was added 1.5 moles (73 g.) of anhydrous sodium cyanide, and 100 ml. (94.5 g.) of anhydrous N,N-dimethylformamide. The mixture was slowly stirred while slowly adding thereto, 0.5 mole (120.4 g.) of alpha-chloropropyltriethoxysilane. During the addition, the temperatures of the contents of the flask rose from 25° C. to 45° C. After the addition, the reaction mixture while continually stirred, was heated to its boiling temperature, about 155° C., under total reflux, for a period of about 5 hours. The reaction mixture was then cooled to room temperature and passed through a diatomaceous earth filter to remove the solid content therefrom. The filtrate was then placed in a flask connected to a fractionating column and distilled under reduced pressure. A yield of 20 g. of alpha-cyanopropyltriethoxysilane, boiling at a temperature of 75–76° C. under a pressure of 0.1 mm. Hg, was obtained. The 20 g. of alpha-cyanopropyltriethoxysilane represented a yield of 17 percent based on the number of moles of the starting alpha-chloropropyltriethoxysilane.

EXAMPLE 4

Following the procedure disclosed in Example 1, a mixture of 2.0 moles (481.6 g.) of gamma-chloropropyltriethoxysilane, 3.0 moles (147.0 g.) of sodium cyanide and 300 ml. (284 g.) of N,N-dimethylformamide was heated, in a flask connected to a distilling column, to its boiling temperature, under total reflux for a period of 18 hours. Filtration of the reaction product and distillation of the filtrate was also conducted as disclosed in the above referred to example, and there was obtained 360 g. of gamma-cyanopropyltriethoxysilane boiling at a temperature of 74–75° C. under a pressure of 0.25 mm. Hg having a density, $d_4^{25}$, 0.960 and a refractive index $n_D^{25}$ of 1.4154. Analysis of the gamma-cyanopropyltriethoxysilane product for carbon, hydrogen, silicon and nitrogen content was conducted with the values obtained in percent by weight, listed in the table below and compared with the corresponding calculated values for the compound.

|  | Gamma-cyanopropyltriethoxysilane | |
| --- | --- | --- |
|  | Found | Calculated |
| Carbon | 51.8 | 51.9 |
| Hydrogen | 9.1 | 9.2 |
| Silicon | 12.0 | 12.1 |
| Nitrogen | 6.3 | 6.1 |

EXAMPLE 5

To a 500 ml., three-necked flask equipped with a stirrer, thermometer, and reflux condenser, were added 0.16 mole (40.1 g.) of delta-chlorobutyltriethoxysilane, 0.30 mole (15 g.) of anhydrous sodium cyanide and 100 ml. (94.5 g.) of anhydrous N,N-dimethylformamide. The mixture was then heated to its boiling temperature (about 160° C.), under total reflux, for a period of four hours. After heating, the contents of the flask were cooled to room temperature and passed through a diatomaceous earth filter to remove the solids contained therein. The filtrate was then placed in a flask connected to a fractionating column and distilled. There was obtained 30 g. of a product boiling at a temperature of from 83° C. to 85° C. under a pressure of 0.7 mm. Hg. This product has a density, $d_4^{25}$ of 0.956 and a refractive index $n_D^{25}$ of 1.4207. The product was identified as delta-cyanobutyltriethoxysilane by elemental analysis for carbon, hydrogen, silicon and nitrogen content. The values obtained, in percent by weight appear in the table below and are compared with the corresponding calculated values for delta-cyanobutyltriethoxysilane.

|  | Delta-cyanobutyltriethoxysilane | |
| --- | --- | --- |
|  | Found | Calculated |
| Carbon | 53.5 | 53.84 |
| Hydrogen | 9.8 | 9.45 |
| Silicon | 11.0 | 11.44 |
| Nitrogen | 6.2 | 5.71 |

The 30 g. of delta-cyanobutyltriethoxysilane obtained, represented a yield of 78 percent based on the number of moles of the starting delta-chlorobutyltriethoxysilane.

EXAMPLE 6

To a flask equipped with stirrer, thermometer and reflux condenser were added 0.5 mole (90.3 g.) of gamma-chloropropyldimethylethoxysilane, 1.0 mole (49 g.) of anhydrous sodium cyanide and 150 ml. (140 g.) of N,N-dimethylformamide. The mixture in the flask was heated, while stirring, to its boiling temperature (approx. 150° C.) under total reflux, for a period of six hours. The contents of the flask were cooled to room temperature and filtered to remove the solids therefrom. The removed solids were washed several times with petroleum ether, the washings combined with the filtrate and the mixture distilled under reduced pressure in a flask connected to a fractionating column. There was obtained 68.5 g. of gamma-cyanopropyldimethylethoxysilane boiling at a temperture of 115–116° C. under a pressure of 23 mm. Hg. Gamma-cyanopropyldimethylethoxysilane has a refractive index, $n_D^{25}$ of 1.4236. Elemental analysis of the obtained gamma-cyanopropyldimethylethoxysilane was conducted for carbon, hydrogen, nitrogen and ethoxy group content. The values obtained appear in the table below in terms of percent by weight and are compared with the corresponding calculated values for the compound.

|  | Gamma-cyanopropyldimethylethoxysilane | |
| --- | --- | --- |
|  | Found | Calculated |
| Carbon | 55.5 | 56.0 |
| Hydrogen | 9.6 | 10.0 |
| Nitrogen | 8.1 | 8.2 |
| Ethoxy group | 25.4 | 26.3 |

EXAMPLE 7

To a 1000 ml., three-necked, round-bottomed flask equipped with a stirrer, reflux condenser and thermometer was added 1.0 mole (240.8 g.) of gamma-chloropropyltriethoxysilane, 1.5 moles (73.5 g.) of sodium cyanide and 150 cc. (135 g.) of N,N-dimethylacetamide. The mixture was heated, while being stirred, to its boiling temperature (approx. 150° C.) under total reflux for a period of about 19 hours. The contents of the flask were then cooled to room temperature and passed through a filter to remove the solids therefrom and the filtrate heated under reduced pressure to distill the solvent. After distilling the solvent, the product was placed in a flask connected to a Vigreux column and distilled under reduced pressure. There was obtained 151.5 g. of gamma-cyanopropyltriethoxysilane boiling at a temperature of 76–78° C. under a pressure of 0.3 mm. Hg ($n_D^{25}$ 1.4152). The 151.5 g. of gamma-cyanopropyltriethoxysilane product represented a yield of 66 percent based on the number of moles of the starting gamma-chloropropyltriethoxysilane.

EXAMPLE 8

To a 1000 ml., three-necked, round-bottomed flask equipped with a stirrer, reflux condenser and thermometer was added 1.0 mole (240.8 g.) of gamma-chloropropyltriethoxysilane, 1.5 moles (73.5 g.) of sodium cyanide and 150 cc. (136 g.) of N,N-diethylformamide. The mixture was maintained, while being stirred, at a temperature between 145°–150° C. for a period of about 19 hours. The contents of the flask were then cooled to room temperature and passed through a filter to remove the solids therefrom and the filtrate heated under reduced pressure to evaporate the solvent. After removing the solvent, the product was placed in a flask connected to a Vigreux column and distilled under reduced pressure. There was obtained 104.1 grams of gamma-cyanopropyltriethoxysilane boiling at a temperature of 83–86° C. under a pressure of 0.8 to 1.2 mm. Hg. ($n_D^{25}$ 1.4152).

Bis(cyanoalkyl)hydrocarbyloxysilanes, tris(cyanoalkyl)hydrocarbyloxysilanes and polycyanoalkylhydrocarbyloxysilanes as well as their corresponding chlorosilanes are also prepared in accordance with the procedures disclosed above. For example, bis(delta-cyanobutyl)diethoxysilane is prepared by reacting 1.5 equivalent weights (97 g.) of potassium cyanide, based on the cyanide content thereof, with one equivalent weight (150.5 g.) of bis(delta-chlorobutyl)diethoxysilane based on the chlorine content thereof within 150 cc. (136 g.) of N,N-diethylformamide. Tris(delta-cyanobutyl)ethoxysilane is prepared by reacting 1.5 equivalent weights (73.5 g.) of sodium cyanide, based on the cyanide content thereof with one equivalent weight (115.8 g.) of tris(delta-chlorobutyl)ethoxysilane based on the chlorine content thereof, with 100 cc. (90.6 g.) of N,N-diethylformamide. In a like manner, gamma,delta-dicyanobutyltriethoxysilane is prepared by reacting 1.5 equivalent weights (97. g.) of potassium cyanide with 1 equivalent weight (144.5 g.) of gamma,delta-dichlorobutyltriethoxysilane, based on the chlorine content thereof, within 100 cc. (90.6 g.) of N,N-diethylformamide.

To illustrate a few of the many applications of the compounds of the instant invention the following examples are provided:

EXAMPLE 9

To a stainless steel pressure vessel were charged 0.22 mole of delta-cyanobutyltriethoxysilane, 2 grams of Raney nickel and 25 ml. of ethanol. Ammonia was then charged to the vessel until the pressure therein reached 100 pounds per square inch. After the addition of the ammonia, hydrogen was charged to the vessel until the pressure therein reached 1500 pounds per square inch. The contents of the vessel were then heated at a temperature of 130° C. for a period of 24 hours. The vessel was then cooled at room temperature and the contents thereof passed through a filter to remove the solid material therefrom. The filtrate was then placed in a flask connected to a Vigreux column and distilled under reduced pressure. There was obtained 0.132 mole of a product boiling at a temperature of 73–74° C. Under a pressure of 0.45 mm. Hg and having a refractive index, $n_D^{25}$ of 1.4260 and a density, $d_4^{25}$ of 0.926. This product was identified as epsilon-aminopentyltriethoxysilane by elemental analysis as well as analysis for molar refraction and neutralization equivalent. The values obtained appear in the table below and are compared with the corresponding calculated values for epsilon-aminopentyltriethoxysilane.

|  | Epsilon-aminopentyltriethoxysilane | |
| --- | --- | --- |
|  | Found | Calculated |
| Carbon, percent by weight | 52.9 | 53.4 |
| Hydrogen, percent by weight | 10.8 | 11.0 |
| Silicon, percent by weight | 11.3 | 11.3 |
| Nitrogen, percent by weight | 5.7 | 5.66 |
| Molar Refraction | 68.7 | 68.3 |
| Neutralization Equivalent | 245 | 247.4 |

EXAMPLE 10

A No. 181 glass cloth, which had been previously heat cleansed, was immersed in a solution consisting of equal parts by weight of water and ethanol and containing 1.3 percent by weight of the aqueous admixture of epsilon-aminopentyltriethoxysilane. After removal from solution, the glass cloth was drained and air dried at room temperature to remove the solvent therefrom.

Laminates were prepared from a portion of the treated glass cloth by laying up and curing in accordance with customary practices, alternating layers of the cloth and a commercial melamine-aldehyde condensation polymer. The laminates, comprising 13 plies, were found to have a dry flexural strength of 57,000 pounds per square inch and a wet flexural strength of 51,000 pounds per square inch. Laminates of the same composition with the exception that the fibrous glass cloth was unsized were found to have a dry strength of only 25,000 pounds per square inch and a wet strength of only 14,000 pounds per square inch.

EXAMPLE 11

To a 500 cc., three-necked flask equipped with a condenser, dropping funnel, thermometer and magnetic stirrer was added a solution comprising 0.1 mole (23.1 g.) of gamma-cyanopropyltriethoxysilane dissolved in 10 grams of anhydrous chloroform. While stirring the solution there was slowly added thereto, by means of the dropping funnel, a mixture comprising 0.1 mole (20.8 g.) of phosphorous pentachloride dissolved in a mixture of 170 grams of chloroform and 10 grams of carbon disulfide. During the addition the temperature of the contents of the flask rose from 27° C. to 55° C. After the addition, the contents of the flask were heated to the boiling temperature (56–60° C.) for a period of three hours. The chloroform and carbon disulfide were distilled from the reaction mixture and the product placed in a flask connected to a fractionating column. There was obtained a yield of 76.7 percent, based on the number of moles of starting materials, of a product boiling at a temperature of 84–89° C. under a pressure of 1 mm. Hg. This fraction was identified as a mixture of gamma-cyanopropyltrichlorosilane and gamma-cyanopropylchlorodiethoxysilane by infra-red and elemental analyses.

EXAMPLE 12

To a 500 ml., three necked, round bottomed flask equipped with stirrer, reflux condenser, and thermometer was charged 50 grams of gamma-cyanopropylmethyldiethoxysilane dissolved in 200 cc. of diethyl ether and 50 cc. of a 5 percent water solution of sodium hydroxide. The mixture was stirred for a period of 24 hours. There resulted a two-phase system, one phase consisting of aqueous ethanol and the other phase consisting of gamma-cyanopropylsiloxane and diethyl ether. The aqueous ethanol phase was decanted and the ether phase washed with water until neutral and dried over anhydrous calcium chloride. The ether solution was concentrated under reduced pressure and there resulted 15.4 grams of a colorless oil. Distillation of the colorless oil in a Hickman Still gave 11 grams of the cyclic trimer of gamma-cyanopropylmethylsiloxane boiling at a temperature of 242°–250° C. under a pressure of 0.2 mm. Hg. A small amount of the cyclic tetramer of gamma-cyanopropylmethylsiloxane boiling at a temperature of 175°–180° C. under a reduced pressure of 0.025 mm. Hg, the cyclic pentamer of gamma-cyanopropylmethylsiloxane boiling at a temperature of 200°–210° C. under a reduced pressure of 0.025 mm. Hg and the cyclic hexaminer of gamma-cyanopropylmethylsiloxane boiling at a temperature of 230°–300° C. under a reduced pressure of 0.01 mm. Hg was obtained.

The cyclic trimer of gamma-cyanopropylmethyl-siloxane has a refractive index $n_D^{25}$ of 1.4558 and was identified by elemental as well as infra-red analysis. The following table contains the data obtained from the elemental analysis for carbon, hydrogen, silicon and nitrogen content of the siloxane. Also appearing in the table are the corresponding calculated values of the elements for the compound.

| | Cyclic Trimer of Gamma-cyanopropyl-methylsiloxane | |
| --- | --- | --- |
| | Found | Calculated |
| Carbon, percent by weight | 47.3 | 47.2 |
| Hydrogen, percent by weight | 7.5 | 7.1 |
| Silicon, percent by weight | 20.4 | 22.2 |
| Nitrogen, percent by weight | 10.4 | 11.0 |
| Molecular Weight | 380 | 381 |

The cyclic tetramer, pentamer and hexamer of gamma-cyanopropylmethylsiloxane were also identified by infra-red analysis and, in addition, were found to have the following refractive indices:

Cyclic tetramer of gamma-cyanopropylmethylsiloxane— $n_D^{25}$ 1.4573
Cyclic pentamer of gamma-cyanopropylmethylsiloxane— $n_D^{25}$ 1.4582
Cyclic hexamer of gamma-cyanopropylmethylsiloxane— $n_D^{25}$ 1.4606

EXAMPLE 13

Following the procedure disclosed in the above example, gamma-cyanopropylphenyldiethoxysilane was hydrolyzed and the product obtained consisted for the most part of the cyclic tetramer of gamma-cyanopropylphenylsiloxane. The cyclic tetramer of gamma-cyanopropylphenylsiloxane was identified by infra-red analysis and has a refractive index $n_D^{25}$ of 1.5488.

EXAMPLE 14

Following the procedure disclosed in Example 12 gamma-cyanopropylethyldiethoxysilane was hydrolyzed and the product obtained consisted for the most part of the cyclic tetramer of gamma-cyanopropylethylsiloxane. The cyclic tetramer of gamma-cyanopropylethylsiloxane was identified by infra-red analysis as well as by elemental analysis and has a refractive index $n_D^{25}$ of 1.4636. The data obtained from the elemental analysis appears in the table below and was compared with the corresponding theoretical values of the elements of the compound.

| | Cyclic Tetramer of Gamma-cyanopropylethylsiloxane | |
| --- | --- | --- |
| | Found | Calculated |
| Carbon, percent by weight | 47.5 | 49.6 |
| Hydrogen, percent by weight | 7.6 | 7.8 |
| Silicon, percent by weight | 18.9 | 19.8 |
| Nitrogen, percent by weight | 9.9 | 9.9 |

EXAMPLE 15

*Gamma-cyanoisobutyl(methyl)polysiloxane*

Into a 500 ml., 3-necked flask fitted with stirrer, condenser, thermometer, and heating mantel was placed 121 grams of [Cl—CH$_2$—CH(CH$_3$)—CH$_2$SiMeO]$_x$ (0.79 mole), 49 grams of NaCN (1.0 mole), 2.4 grams of KI (2 wt.-percent) and 150 ml. of dry N,N-dimethylformamide. The mixture was heated with stirring to a temperature in the range of 155 to 160° C. for 16 hours. On cooling to <50° C. 100 ml. of CHCl$_3$ and about 2 grams of decolorizing charcoal (80 mesh) were added. The mixture was then filtered through Magnesol. The filtrate was stripped to 150° C. at 1.0 mm. of mercury pressure, taken up in 250 ml. of methylisobutylketone and washed repeatedly with water. The product layer was again stripped to 150° C. at 1.0 mm. of mercury pressure and finally distilled at reduced pressure to give 30 grams of [NC—CH$_2$—CH(CH$_3$)—CH$_2$—SiMeO]$_x$ B.P. 277 to 300° C. at 0.18 mm. of mercury pressure and an index of refraction, $n_D^{25}$ of 1.4603. A 50 wt.-percent gamma-cyanoisobutylmethyl modified dimethyl gumstock was prepared by mixing one mole of the gamma-cyano-isobutyl(methyl)polysiloxane, one mole of dimethylpolysiloxane and a catalytic amount of CsOH and heating the mixture at 150° C.

EXAMPLE 16

Into a 1-liter, 3-necked flask equipped with reflux condenser, mechanical stirrer, and dropping funnel were charged 115 grams (1 mole) of $CH_3SiHCl_2$, 200 cc. of trichloroethylene and 4.1 grams platinum-on-gamma-alumina catalyst (2 parts by weight platinum per 100 parts by weight of gamma-alumina). The mixture was heated with stirring until the $CH_3SiHCl_2$ started to reflux (40 to 45° C.) and 90.5 (1 mole) of methallyl chloride was then added by means of the dropping funnel in small increments over a 2.5 hour period. The reaction was very exothermic. After the addition was complete the mixture was heated at 80° C. for an additional hour. The mixture was then cooled, filtered to remove the catalyst, and the solvent was evaporated from the filtrate under reduced pressure. The residue was fractionated through a glass-helix packed column under reduced pressure to give 163 grams (80 mole-percent yield) of $$ClCH_2CH(CH_3)CH_2Si(CH_3)—Cl_2,$$

B.P. 59° C. (at 5.0 mm.), $n_D^{25}$ 1.4617. The compound was identified by infra-red spectrum and elemental analysis:

Calculated for $C_5H_{11}SiCl$: Si, 13.65 wt.-percent; Cl, 51.9 wt.-percent. Found: Si, 12.4 wt.-percent; Cl, 52.1 wt.-percent.

EXAMPLE 17

Into a 500 cc., 3-necked round-bottomed flask equipped with stirrer, dropping funnel, and air condenser attached to a water aspirator, were charged 45 grams (0.22 mole) of $ClCH_2CH(CH_3)CH_2Si(CH_3)Cl_2$ and 100 cc. of trichloroethylene. Distilled water (10 cc.) was added dropwise under reduced pressure (40 mm.) with stirring over a 15-minute period. The mixture was then heated to 40° C. and maintained for 30 minutes. The solvent was then evaporated under reduced pressure and the residual oil filtered through a fitted glass filter to five 27.5 grams (83.4 mole-% yield of $[ClCH_2CH(CH_3)CH_2Si(CH_3)O]$, $n_D^{25}$ 1.4655. The material was then distilled to give 22.4 grams of liquid; B.P. 140 to 150° C. (0.2 mm.), $n_D^{25}$ 1.4650. This liquid was identified by infrared as a mixture of the cyclic trimer and tetramer, i.e.

$$[ClCH_2CH(CH_3)CH_2Si(CH_3)O]_3$$
and
$$[ClCH_2CH(CH_3)CH_2Si(CH_3)O]_4$$

The compounds of this invention can be hydrogenated to produce aminoalkylsilicon compounds that are particularly useful as sizes for fibrous glass materials to enhance the bonding of the fibrous glass materials to thermosetting resins in the production of laminates.

This application is a continuation-in-part of application Serial No. 809,929, filed April 30, 1959, which was a continuation-in-part of application Serial No. 555,203, filed December 23, 1955, now both abandoned.

What is claimed is:

1. A process for producing a cyanoalkylsilicon compound which comprises reacting (1) an ionic metal cyanide of the class consisting of the alkali metal cyanides and the alkaline earth metal cyanides and (2) a haloalkylsilicon compound of the class consisting of the haloalkylpolysiloxanes and the haloalkylhydrocarbyloxysilanes, said haloalkylsilicon compound being free of halogen substitution on the beta carbon atom of the haloalkyl group thereof, in a dialkyl acylamide as a solvent to displace the halogen atom of the haloalkyl group with the cyano group of the ionic metal cyanide to produce the cyanoalkylsilicon compound and an ionic metal halide.

2. The process as claimed in claim 1 wherein the haloalkylsilicon compound is a haloalkylpolysiloxane and the cyanoalkylsilicon compound produced is a cyanoalkylpolysiloxane.

3. The process claimed in claim 1 wherein the ionic metal cyanide is an alkali metal cyanide and wherein the dialkyl acylamide has the formula:

$$R'[-\underset{\underset{O}{\|}}{C}-NR''R''']_y$$

wherein R' is a member selected from the group consisting of the mono-, di- and trivalent aliphatic hydrocarbyl groups, R'' and R''' are alkyl groups and y is an integer having a value of from 1–3 inclusive.

4. The process claimed in claim 1 wherein the ionic metal cyanide is an alkali metal cyanide.

References Cited in the file of this patent
UNITED STATES PATENTS

| | | |
|---|---|---|
| 2,783,262 | Merker | Feb. 26, 1957 |
| 2,783,263 | Merker | Feb. 26, 1957 |
| 3,053,874 | Pepe et al. | Sept. 11, 1962 |

FOREIGN PATENTS

| | | |
|---|---|---|
| 553,606 | Belgium | Jan. 15, 1957 |

OTHER REFERENCES

Krieble et al.: Jour. American Chem. Soc., vol. 68, November 1946, pages 2291–4.

Hauser et al., ibid., vol. 74, October 1952, pages 5091–6.

Prober, ibid., vol. 77, June 1955, pages 3224–8.